June 13, 1950     N. G. A. MALMQUIST     2,511,279

RESILIENT WHEEL BODY

Filed July 11, 1947

Inventor:
N. G. A. Malmquist
By E. F. Wenderoth
Atty

Patented June 13, 1950

2,511,279

UNITED STATES PATENT OFFICE 2,511,279

RESILIENT WHEEL BODY

Nils Gunnar August Malmquist, Malmo, Sweden, assignor to Svenska Aktiebolaget Bromsregulator, Malmo, Sweden, a corporation of Sweden Application July 11, 1947, Serial No. 760,355
In Sweden July 22, 1946

5 Claims. (Cl. 295—11)

The present invention relates to improvements in such resilient wheel bodies with a hub and a wheel rim, in which the hub and the wheel rim both in radial and axial direction are resiliently connected with each other by means of disks arranged at substantially right angles to the wheel shaft and connected alternately with the hub and with the wheel rim, and by means of blocks of resilient material, e. g. rubber, disposed and clamped under axial compression between said wheel disks. Examples of wheel bodies of this type are shown in the U. S. patent specifications Nos. 2,086,720 and 2,328,660. In the wheel bodies shown in these prior patent specifications the turning of those recesses in the different wheel disks within which the rubber blocks are to be mounted, requires the use of tool machines especially constructed for this purpose, or additional apparatus to such machines, and special clamping means for the work piece.

One object of the present invention is to make it possible to produce the mounting recesses for the rubber blocks already in the drilling machine in which the holes for the clamping bolts in the wheel disks are drilled, whereby an important advantage is obtained as regards the manufacture of the wheel.

Another object of the invention is to provide a new method for the assembling of the wheel body, whereby this operation is facilitated.

A further object of the invention is to permit the thickness of the different wheel disks to be chosen considerably smaller than before without decreasing the strength, which brings the essential advantage of an important saving of weight.

For these objects and for such further objects as may be evident from a study of an elucidative embodiment of the invention shown in the annexed drawing and particularly described in the following, the invention is characterized by the fact that plates of sheet metal or other hard material, with which the resilient blocks of rubber or the like are capped at their end surfaces facing the wheel disks, have concave outer sides and are provided at their central portion with a projection having a conical outer surface for cooperation with a corresponding recess in the wheel disk, said plates or caps being applied against the wheel disks only along or near their outer periphery and at their central portion by the intermediary of the projection there provided.

Figure 1:
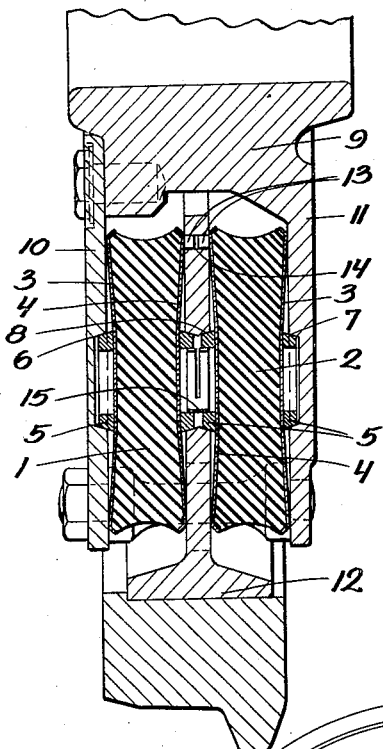
Figure 2:
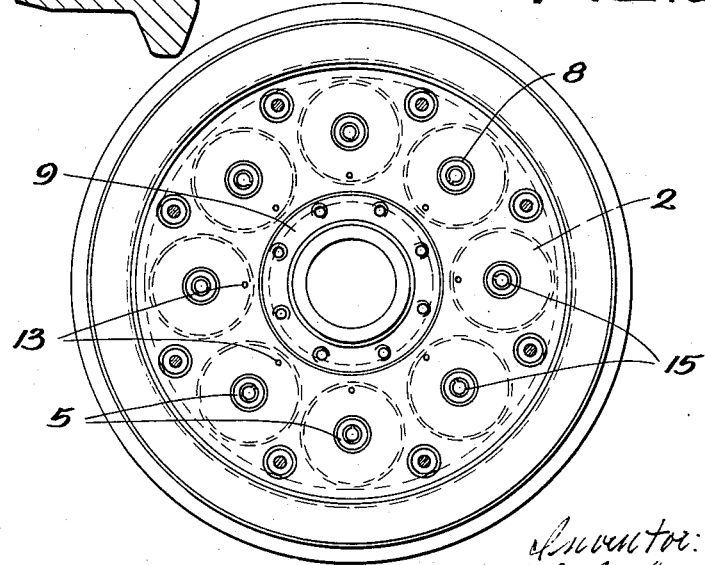

Further features and advantages of the invention will appear from the following description, reference being had to the annexed drawing in which Fig. 1 shows an axial section and Fig. 2 a side view of a portion of a wheel body construction in accordance with the invention.

As shown in the drawing, the rubber blocks 1, 2 of circular section are inserted between inwardly cup-shaped and outwardly concave sheet metal plates 3, 4 which may be vulcanized to the rubber blocks and form caps on their end surfaces facing the wheel disks 10, 11, 12. Said sheet metal caps 3, 4 are provided at their central portions with projections in the form of axially projecting conical studs 5 fitting within corresponding recesses 6, 7, 8 in the two disks 10, 11 connected to the wheel hub 9 and in the central disk 12 carrying the wheel rim. These studs 5 have a substantially smaller diameter than the rubber blocks, so that the recesses in the wheel disks for receiving the studs may very well be made in a drilling machine. Owing to their outwardly concave form the sheet metal caps 3, 4, when pressed against the wheel disks, will be applied against the latter only through their studs 5 reposing in the recesses 6, 7, 8 and along or near their periphery. Hereby there is obtained an advantageous utilization of the clamping friction for preventing rotation of the rubber blocks and the sheet metal caps in relation to the wheel disks, and the studs and recesses need not be made with any great precision as there is space for elastic deformation of the sheet metal caps so that the studs automatically will be pressed into firm contact within the recesses upon the clamping of the rubber blocks between the wheel disks. In order that the sheet metal caps may be further secured against rotation in relation to the wheel disks, e. g. the sheet metal caps 4 facing the central disk 12 may be provided with pins 13 near their periphery, which pins engage corresponding holes 14 in the central disk 12.

The recesses 6 and 7 in the hub disks 10 and 11 are preferably not through-holes, and on account of their relatively small diameter they do not cause such a weakening of the hub disks as the large recesses of the construction disclosed in the aforesaid U. S. patent specifications Nos. 2,086,720 and 2,328,660. This results in the advantage that the hub disks may be made of a thinner material outside the recesses than has been possible in the known construction. The difference is still more obvious as regards the central disk where the recesses 8 together preferably form a through-hole which is conically tapering from both sides. The strength of the disk is determined in this case by its thickness and is influenced only to a small extent by the holes 8, whereas the strength of the central disk in the known construction is substantially determined by the remaining thickness between the bottoms of the two opposite recesses.

The studs 5 are preferably not solid but have rather central borings which is advantageous partly for their welding to the sheet metal caps, partly also because the assembling of the wheel may then be facilitated by insertion of a split resilient (expanding) sleeve 15 in the studs projecting from opposite sides into the recesses 8 of the central disk 12, whereby the rubber blocks 1, 2 may be mounted on the central disk and said disk together with the rubber blocks may then be handled as a unity when assembling the wheel. The sleeve 15 is preferably split in such a manner by means of a longitudinal cut and a second cut crossing the first one and extending along a part of the periphery of the sleeve that the end portions of the sleeve lying at both sides of the transverse cut and engaging the studs 5 engaging the recesses 8 are able to yield independently of each other.

The caps 3, 4 can be so shaped that they are plane when in a free condition and take their concave form shown in the drawing owing to the axial clamping pressure exerted on the rubber blocks 1, 2 when these are in clamped position between the wheel disks 10, 11, 12.

What I claim and desire to secure by Letters Patent is:

1. In a resilient wheel comprising a hub, a rim, relatively movable axially spaced overlapping flanges on the hub and the rim, and a plurality of non-metallic resilient blocks clamped under axial compression between said relatively movable flanges in spaced relationship to one another about the axis of the wheel for resiliently connecting the hub and the rim of the wheel to each other, plates of a relatively hard material capping the end surfaces of said non-metallic resilient blocks and having concave outer sides facing said flanges, and conical shaped axial projections disposed centrally on each said capping plate, said flanges having conical recesses receiving said projections, and said capping plates having bearing contact against said flanges only adjacent the periphery of said plates and adjacent the centers thereof by the intermediary of said projections fitting said recesses.

2. In a resilient wheel as claimed in claim 1 the additional feature that said axial projection disposed centrally on the concave outer side of each of said plates capping the end surfaces of said non-metallic blocks is in the form of a conical stud having an axial bore.

3. In a resilient wheel as claimed in claim 1 the additional feature that the plates capping the ends of the non-metallic resilient blocks clamped under axial compression between the axially spaced overlapping hub and rim flanges of the wheel are flat in shape when in a normal free state and take their outwardly concave form owing to the axial clamping pressure exerted on the non-metallic resilient blocks when clamped in position between the hub and rim flanges of the wheel.

4. In a resilient wheel comprising three axially spaced overlapping hub and rim flanges of which the intermediate one is movable in relation to the two outer ones both axially and radially, and non-metallic resilient blocks disposed in spaced relationship to one another about the axis of the wheel on both sides of the intermediate flange and clamped under axial compression between the intermediate flange and the two outer flanges for resiliently connecting the hub and the rim of the wheel with each other, plates of a relatively hard material capping the end surfaces of said non-metallic resilient blocks and having concave outer sides facing said flanges, axially projecting conical studs provided centrally on said capping plates and having axial bores therein, the flanges being provided in their facing sides with conical recesses receiving said conical studs, the recesses in the opposite sides of the intermediate flange being axially aligned and forming through-holes in said intermediate flange, split sleeves having their end portions fitted in the axially aligned bores of the conical studs fitting the recesses in the opposite sides of the intermediate flange, and said capping plates having bearing contact against said flanges only adjacent the periphery of said plates and adjacent the centers thereof by the intermediary of said conical studs fitting said conical recesses.

5. In a resilient wheel as claimed in claim 4 the additional feature that the sleeves which with their end portions are fitted in the axially aligned bores of the conical studs fitting the conical recesses in the opposite sides of the intermediary flange are so split that the two end portions of each of said sleeves are capable of yielding independently of each other.

NILS GUNNAR AUGUST MALMQUIST.

REFERENCES CITED

The following references are of record in the file of this patent:

UNITED STATES PATENTS

| Number | Name | Date |
|---|---|---|
| 2,138,506 | Piron | Nov. 29, 1938 |
| 2,175,118 | Hirshfeld | Oct. 3, 1939 |
| 2,263,884 | Malmquist | Nov. 25, 1941 |